United States Patent [19]

Clegg

[11] Patent Number: 4,621,616
[45] Date of Patent: Nov. 11, 1986

[54] ANNULAR SOLAR PANEL

[76] Inventor: John E. Clegg, 2320 Keystone Dr., Orlando, Fla. 32806

[21] Appl. No.: 732,982

[22] Filed: May 13, 1985

[51] Int. Cl.⁴ .............................................. F24J 3/02
[52] U.S. Cl. ................................... 126/440; 126/417; 126/901
[58] Field of Search ............... 126/440, 448, 451, 417, 126/901

[56] References Cited

U.S. PATENT DOCUMENTS

| 957,013 | 10/1909 | Severy | 126/440 X |
| 2,277,311 | 3/1942 | Freeman | 126/440 |
| 3,939,819 | 2/1976 | Minardi | 126/900 X |
| 4,116,222 | 9/1978 | Seifried | 126/900 X |
| 4,137,899 | 2/1979 | Weslow | 126/440 |
| 4,139,286 | 2/1979 | Hein et al. | 126/440 X |

Primary Examiner—Larry Jones

[57] ABSTRACT

Five concentric annular conical beam concentrators mounted above a black-water heat-transfer tank through which domestic household water circulates in tubes. The conical beam concentrators receive convergent conical incipient beams of diffused sunlight and emit concentrated annular beams into the black water. The black water absorbs the heat of the beams and transfers the heat to the tubes through which the domestic water circulates. The panel is designed for use in cloudy overcast areas which receive little direct sunlight during the winter months.

1 Claim, 4 Drawing Figures

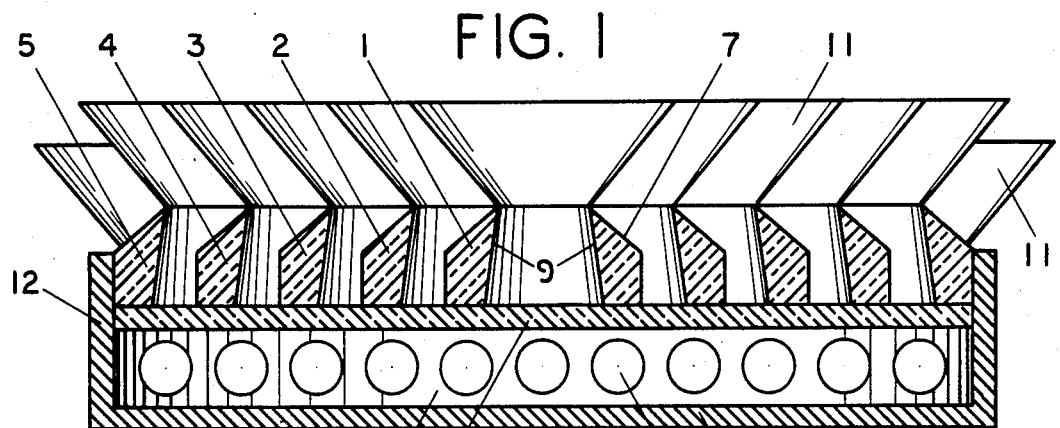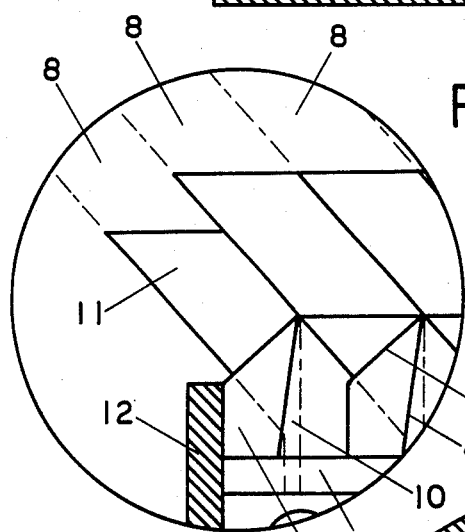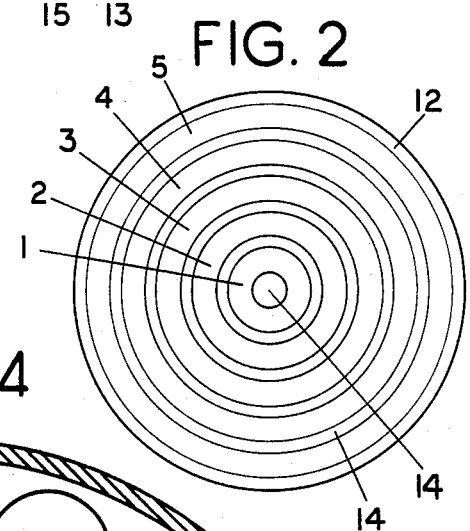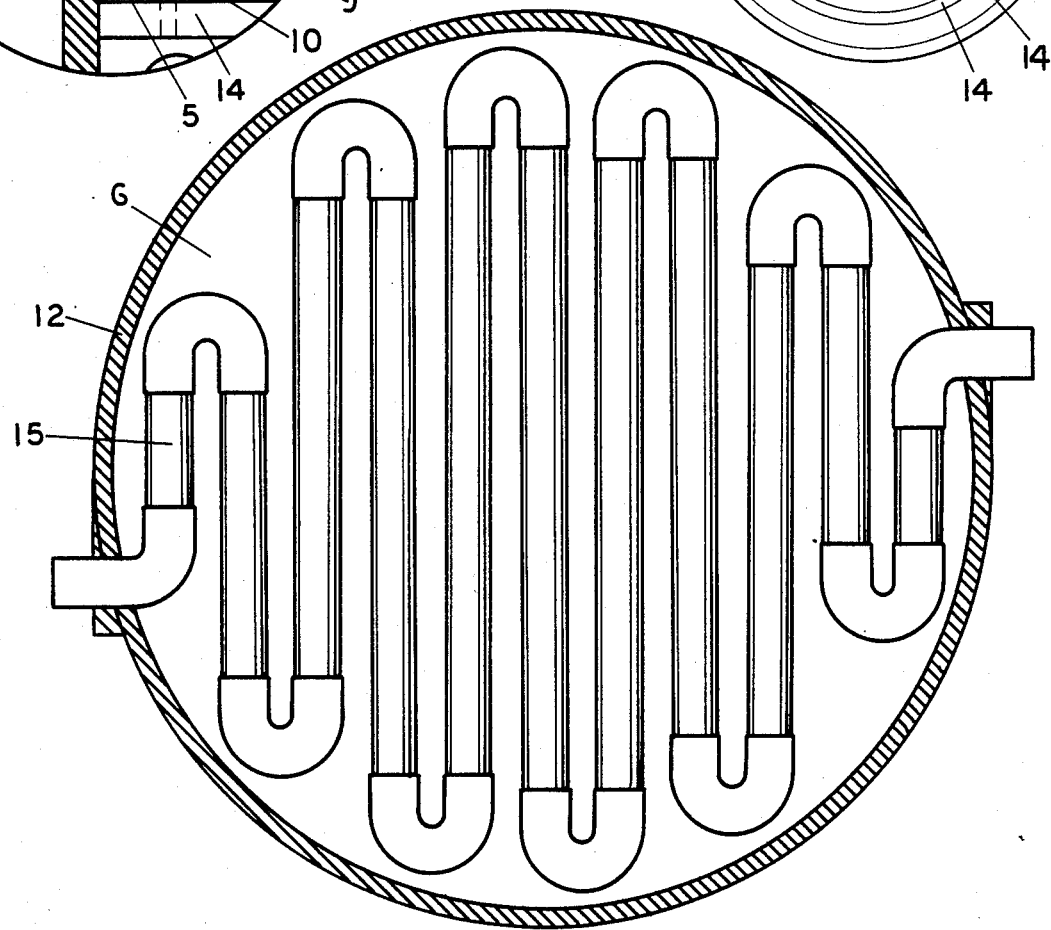

ANNULAR SOLAR PANEL

BACKGROUND

Prior lens art includes U.S. Pat. No. 2,882,784 by Toffolo. This lens has a convex conical section (face) which could receive a convergent conical incipient beam, but the lens also has a concave conical section which is parallel to the convex conical section. Refraction of the incipient beam would not occur, and there would be no concentration of the beam.

Concurrent lens art includes the *Conical Beam Concentrator Heater,* Ser. No. 641,274, filed 8/16/84, by this inventor. This heater is powered by an annular conical beam concentrator which is identical to the concentrators disclosed herein. The heater is a circular ceiling metal plate mounted below the concentrator.

Concurrent panel art featuring a black-water heat transfer medium includes the *Black-Water Solar Collector,* Ser. No. 727,938, filed 4-26-85, by this inventor. This collector has domestic water circulating through expansion flow tubes submerged in a black-water tank.

SUMMARY

The invention introduces a new concept in the use of solar energy. Diffused sunlight is used as a source of heat. A large convergent conical incipient beam of diffused sunlight is received by the beam concentrator and reduced in size to a small concentrated beam which is projected onto a metal heating element.

To suggest that diffused sunlight can form "a convergent conical incipient beam" requires some explanation. Diffused sunlight is by definition scattered and dispersed, and the light particles, having been deflected by collisions with other particles and with atoms and molecules of the atmosphere, are travelling in random and erratic paths of propagation.

There is a selective process of beam formation, however, by which certain particles are received by the lens while other particles are rejected. Only those particles travelling in paths which are perpendicular to the convex conical sections of the lenses are received into the lens and refracted out of the lens to form the concentrated beam. All other particles are refracted into the lens and thereby rejected from the concentrated beam by the second refraction.

So it is apparent that a beam is formed from the area designated "convergent conical incipient beam."

It should be pointed out that binoculars and terresterial telescopes would be inoperative if there were no such thing as a beam of diffused sunlight.

The annular solar panel is designed primarily for use in cloudy overcast areas such as the Pacific Northwest where there is little direct sunlight during the winter months. Solar panels which depend on direct sunlight for their heat are inoperative when the sky is overcast. Panels which are powered by diffused sunlight, however, are operative throughout the day regardless of weather conditions and are ideally suited for use in overcast areas.

DRAWINGS

FIG. 1 is an elevation of the annular solar panel with the lenses shown in section.

FIG. 2 is a top view of the panel with the hoods removed.

FIG. 3 is an enlarged elevation of a portion of the panel with a ray diagram.

FIG. 4 is a cross section of the panel through the black-water tank showing the domestic water tubes.

DESCRIPTION

FIG. 1 is an elevation of the annular solar panel comprising five concentric annular conical beam concentrators 1 through 5 mounted above black-water heat-collection heat-transfer tank 6. Each concentrator 1 through 5 consists of a single lens with a convex conical section 7 (FIG. 3) which receives a convergent conical incipient beam 8 of diffused sunlight and with a concave conical section 9 which refracts and emits the beam, forming a concentrated annular beam 10 which is reduced in width by a factor of 0.143. Six conical sheet-metal hoods 11 intercept radiation from outside incipient beams 8.

Black-water tank 6 consists of cylindrical wall 12, base 13 and plate-glass cover window 14 which serves as mounting platform for the beam concentrators. The black water is a solution of water and alcohol to which black dye has been added to render the water opaque to the transmission of light. The black water absorbs the heat of concentrated beams 10 and transfers the heat to tubes 15 through which domestic household water circulates.

I claim:

1. An annular solar panel comprising five concentric annular conical beam concentrators (1 through 5), a black-water heat-collection heat-transfer tank (6), and tubes (15) through which domestic household water circulates;

each conical beam concentrator (1 through 5) having a convex conical section (7) which receives and transmits a convergent conical incipient beam (8) of diffused solar radiation and having a concave conical section (9) which refracts and emits beam (8), forming a concentrated annular beam (9), black-water tank (6) comprising a cylindrical wall (12), a base (13) and a plate-glass cover window (14) serving as mounting platform for conical beam concentrators (1 through 5), and tubes (15) comprising conduits submerged in black-water tank (6).

* * * * *